United States Patent
Lai et al.

(10) Patent No.: US 10,125,929 B2
(45) Date of Patent: Nov. 13, 2018

(54) LIGHT GUIDE BAR AND CONNECTOR ASSEMBLY

(71) Applicant: GIGA-BYTE TECHNOLOGY CO., LTD., New Taipei (TW)

(72) Inventors: Chih-Ming Lai, New Taipei (TW); Yung-Shun Kao, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 98 days.

(21) Appl. No.: 15/215,604

(22) Filed: Jul. 21, 2016

(65) Prior Publication Data

US 2017/0314747 A1     Nov. 2, 2017

(30) Foreign Application Priority Data

Apr. 29, 2016  (TW) .............................. 105113362 A
Jun. 17, 2016  (TW) .............................. 105119043 A (51) Int. Cl.
*F21V 21/088*     (2006.01)
*F21S 4/28*       (2016.01)
(Continued)

(52) U.S. Cl.
CPC ................ *F21S 4/28* (2016.01); *F21V 33/00* (2013.01); *G02B 6/0001* (2013.01);
(Continued)

(58) Field of Classification Search
CPC .......... F21S 4/28; F21V 33/00; F21V 21/002; F21V 21/005; F21V 21/025;
(Continued)

(56) References Cited

U.S. PATENT DOCUMENTS 6,368,159 B1    4/2002  Hess et al.
7,207,815 B1    4/2007  Ju
(Continued)

FOREIGN PATENT DOCUMENTS

EP    1315240     5/2003
EP    2113969    11/2009
(Continued)

OTHER PUBLICATIONS

Avexir, Core Series (DD4D), Product Web Page, Dec. 27, 2014.*
(Continued)

*Primary Examiner* — Evan Dzierzynski
*Assistant Examiner* — Keith G Delahoussaye
(74) *Attorney, Agent, or Firm* — JCIPRNET (57) ABSTRACT

A light guide bar adapted to be interleaved between two connectors which are disposed on a main board. Each of the connectors has a connector lateral wall. At least one connector includes a positioning protrusion. The light guide bar includes a body. The body includes two opposite light guide bar lateral walls and at least one positioning recess. Each positioning recess is formed on one of the light guide bar lateral walls. The at least one positioning recess is adapted to be positioned on the positioning protrusion of the at least one connector. A connector assembly having the light guide bar and the two connectors is further provided.

16 Claims, 7 Drawing Sheets

(51) Int. Cl.
    *H01R 13/717* (2006.01)
    *F21V 33/00* (2006.01)
    *F21V 8/00* (2006.01)
(52) U.S. Cl.
    CPC ....... *H01R 13/7172* (2013.01); *G02B 6/0078* (2013.01); *G02B 6/0088* (2013.01)
(58) Field of Classification Search
    CPC ................ H01R 9/2425; H01R 13/717; H01R 13/7172; H01R 13/7175; H01R 13/7177
    USPC .......................................... 362/516–518, 581
    See application file for complete search history.

(56) References Cited

U.S. PATENT DOCUMENTS

| | | |
|---|---|---|
| 2005/0095913 A1 | 5/2005 | Fan |
| 2011/0256769 A1 | 10/2011 | Wu |
| 2012/0127706 A1* | 5/2012 | Jiang .................... F21S 8/036 362/218 |
| 2016/0020539 A1* | 1/2016 | Li ........................ H01R 12/707 439/155 |

FOREIGN PATENT DOCUMENTS

| | | |
|---|---|---|
| EP | 2317352 | 5/2011 |
| WO | 2008022007 | 2/2008 |
| WO | 2010009067 | 1/2010 |

OTHER PUBLICATIONS

"Search Report of Europe Counterpart Application", dated Jun. 20, 2017, p. 1-p. 9, in which the listed references were cited.
"Office action of Europe Counterpart Application", dated Jul. 9, 2018, p. 1-p. 9.
Chao-Heng Chien, et al., "A study of LED light-linear device for light guide plate applications," Proceedings of the SPIE, vol. 6668, Sep. 2007, pp. 1-9.

* cited by examiner

LIGHT GUIDE BAR AND CONNECTOR ASSEMBLY

CROSS-REFERENCE TO RELATED APPLICATION

This application claims the priority benefits of Taiwan application serial no. 105113362, filed on Apr. 29, 2016 and Taiwan application serial no. 105119043, filed on Jun. 17, 2016. The entirety of each of the above-mentioned patent applications is hereby incorporated by reference herein and made a part of this specification.

BACKGROUND OF THE INVENTION

[Field of the Invention]

The invention relates to a light guide bar and a connector assembly, and particularly to a light guide bar that can be easily fixed between two connectors and a connector assembly including the light guide bar and the two connectors.

[Description of Related Art]

Currently, screw tightening, adhesion, hot riveting and so on are common methods for fixing a component onto other components (e.g., connector) on a main board. In terms of screw tightening, it is required to respectively drill screw holes and through holes on two components and then tighten screws to fix the two components. In terms of adhesion, it may be difficult to determine whether the components are properly positioned if the space is limited, and overflow of the adhesive may also occur sometimes. In terms of hot riveting, the components need to be heated to be melted and deformed so as to be combined, which may be troublesome for fabrication.

In the case where the connector is a memory connector, since a high-end memory module may be provided with a fan on one side to quickly dissipate the heat generated by the chip on the memory module by air circulation, this type of memory module may be heavier. When the memory module is inserted into the memory connector on the main board, it may cause the case of the memory connector to crack. Thus, how to prevent crack of the connector is also an issue that needs to be addressed.

SUMMARY OF THE INVENTION

The invention provides a light guide bar that can be easily fixed between two connectors for guiding a light between the two connectors to achieve effects of indication and decoration and prevent crack of the connectors.

The invention provides a connector assembly that includes the light guide bar and the two connectors.

The invention provides a light guide bar that is adapted to be disposed between two connectors. The two connectors are disposed on a main board. Each of the connectors includes a connector lateral wall. At least one of the connectors includes a positioning protrusion that protrudes from the connector lateral wall. The light guide bar includes a light guide bar body. The light guide bar body includes two opposite light guide bar lateral walls and at least one positioning recess. Each positioning recess is formed on one of the light guide bar lateral walls. The positioning recess is adapted to be positioned on the positioning protrusion of the connector.

In an embodiment of the invention, the two connectors respectively include the two opposite connector lateral walls and the two positioning protrusions that protrude from the two connector lateral walls, and the light guide bar body includes the two positioning recesses that respectively formed on the two light guide bar lateral walls and are adapted to be positioned on the two positioning protrusions of the two connectors.

In an embodiment of the invention, the light guide bar body includes a light guide bar bottom surface connecting the two light guide bar lateral walls, the light guide bar includes at least one guiding part, and each guiding part is disposed on one of the light guide bar lateral walls and located between the positioning recess and the light guide bar bottom surface.

In an embodiment of the invention, the positioning recess is surrounded and defined by a plurality of restricting surfaces.

In an embodiment of the invention, the light guide bar body includes a plurality of notches located on a surface of the light guide bar body or inside the light guide bar body.

In an embodiment of the invention, the light guide bar body includes four light guide bar lateral walls, each of the light guide bar lateral walls is connected to the two adjacent light guide bar lateral walls respectively, and one of the light guide bar lateral walls that does not include the positioning recess includes a protruding or recessed pulling part.

In an embodiment of the invention, one of the light guide bar lateral walls is adapted to introduce light emitted from a light source that is disposed on the main board at a position close to the two connectors, and the light guide bar lateral wall is located beside the light source.

The invention provides a connector assembly that is adapted to be disposed on a main board. The connector assembly includes at least two connectors and at least one light guide bar. The connectors are arranged in parallel and each include a connector lateral wall, and at least one of the connectors includes a positioning protrusion that protrudes from the connector lateral wall. Each light guide bar is disposed between adjacent two of the connectors and includes a light guide bar body. The light guide bar body includes two opposite light guide bar lateral walls and at least one positioning recess. Each positioning recess is formed on one of the light guide bar lateral walls. The positioning recess is adapted to be positioned on the positioning protrusion of the connector.

In an embodiment of the invention, adjacent two of the connectors respectively include the two opposite connector lateral walls and the two positioning protrusions that protrude from the two connector lateral walls, and each light guide bar body includes the two positioning recesses that respectively formed on the two light guide bar lateral walls and are adapted to be positioned on the two positioning protrusions of the adjacent two of the connectors.

In an embodiment of the invention, each light guide bar body includes a light guide bar bottom surface connecting the two light guide bar lateral walls, each light guide bar includes at least one guiding part, and each guiding part is disposed on one of the light guide bar lateral walls and located between the positioning recess and the light guide bar bottom surface.

In an embodiment of the invention, the positioning recess is surrounded and defined by a plurality of restricting surfaces.

In an embodiment of the invention, each light guide bar body includes a plurality of notches located on a surface of the light guide bar body or inside the light guide bar body.

In an embodiment of the invention, each light guide bar body includes four light guide bar lateral walls, each of the light guide bar lateral walls is connected to the two adjacent light guide bar lateral walls respectively, and one of the light guide bar lateral walls that does not include the positioning recess includes a protruding or recessed pulling part.

In an embodiment of the invention, one of the light guide bar lateral walls is adapted to introduce light emitted from a light source that is disposed on the main board at a position close to the two connectors, and the light guide bar lateral wall is located beside the light source.

In an embodiment of the invention, each connector includes a stopper that protrudes from the connector lateral wall and abuts against a light guide bar top surface of the light guide bar body.

In an embodiment of the invention, the connector includes a connector body and a connector cover disposed closely outside the connector body. The connector body includes the positioning protrusion, the connector lateral wall is a wall surface of the connector cover, and the positioning protrusion is exposed and protrudes from the connector cover.

In an embodiment of the invention, the connector cover includes the stopper that includes an inclined arm or a protrusion.

In an embodiment of the invention, the connector body includes the stopper that is exposed from the connector cover.

Based on the above, according to the invention, the light guide bar is disposed between two connectors, and the relative positions of the light guide bar and the two connectors are easily fixed by the engagement of the positioning protrusions of the connectors and the positioning recesses of the light guide bar. The light guide bar is adapted to be in contact with or close to the light sources on the main board, such that at least a portion of the light emitted by the light sources may enter the light guide bar to generate a strip light between the two connectors for indicating the locations of the connectors in the dark as well as achieving an effect of decoration. In addition, if a heavier expansion card is inserted onto the connector and causes a side of the connector to be pressed by the expansion card, the connector may crack. According to the invention, the light guide bar is disposed beside the connector and applies a counter force on the connector to prevent the connector from being cracked.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
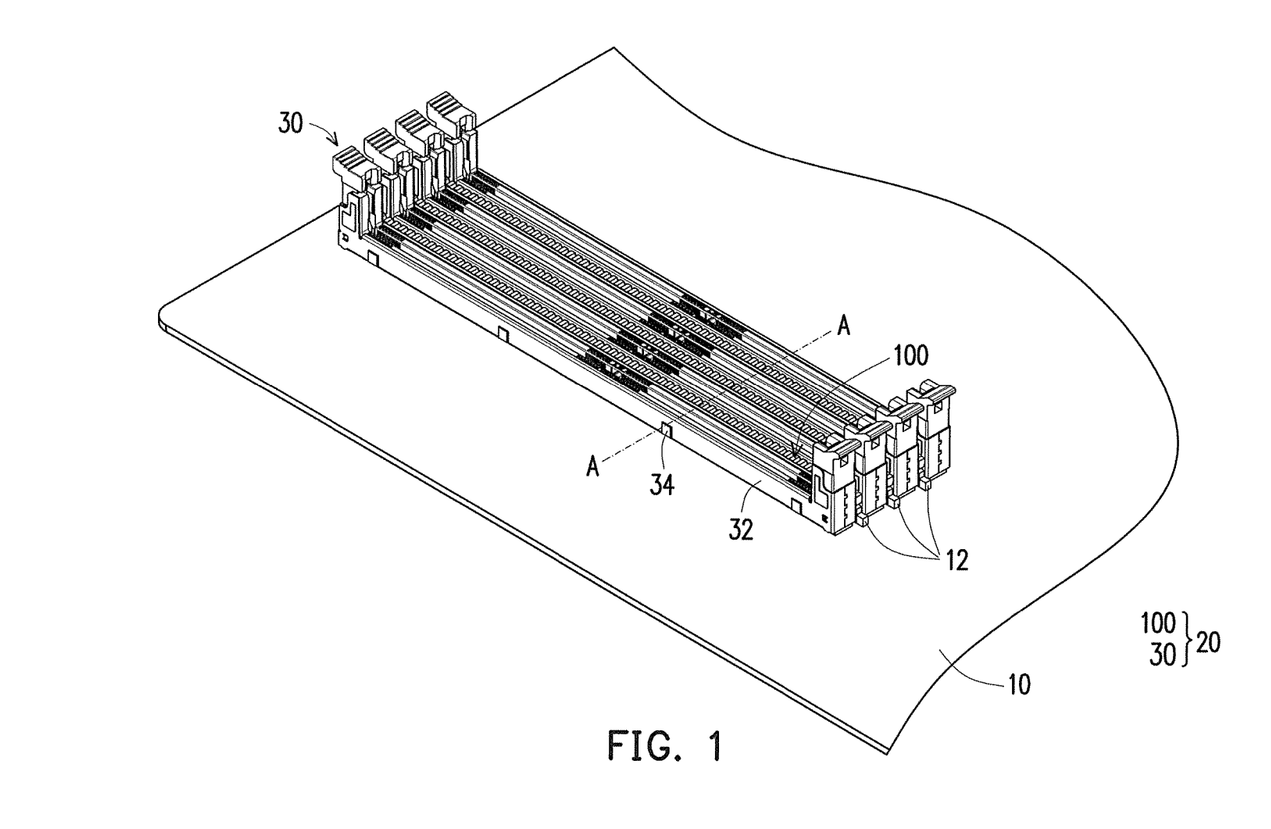
FIG. 1 is a schematic view of a connector assembly disposed on a main board according to an embodiment of the invention.

FIG. 1 is a schematic view of a connector assembly disposed on a main board according to an embodiment of the invention. Referring to FIG. 1, a connector assembly 20 of this embodiment is disposed on a main board 10 and the connector assembly 20 includes a plurality of connectors 30 that are fixed onto and electrically connected with the main board 10. In this embodiment, the connector 30 is a memory module connector, for example, but the type of the connector 30 is not limited thereto.

In order to guide light for the connector 30, decorate the connector 30, and reduce the possibility of crack of the connector 30, the connector assembly 20 further includes at least one light guide bar 100 so as to achieve the aforementioned functions. Details are described hereinafter.

As shown in FIG. 1, the connector assembly 20 of this embodiment includes four connectors 30 and three light guide bars 100, for example. The four connectors 30 are arranged in parallel to form three gaps and the three light guide bars 100 are disposed in the three gaps respectively. Of course, the number of the connectors 30 and the number of the light guide bars 100 are not limited to the above. In some other embodiments, the connector assembly 20 may only require two connectors 30 and one light guide bar 100.

In order to achieve the effects of light guidance and decoration near the connector 30, a plurality of light sources 12 are disposed on the main board 10 and each of the light sources 12 is disposed near a position between two connectors 30. More specifically, in the connector assembly 20 of this embodiment, one light guide bar 100 is disposed between two adjacent connectors 30 to guide a strip light between the two connectors 30, and two light sources 12 are disposed at two ends of the light guide bar 100. The two light sources 12 are respectively in contact with or close to the two ends of the light guide bar 100 and are electrically connected with the main board 10, such that at least a portion of the light emitted by the light sources 12 enters the light guide bar 100 via the two ends to emit the strip light along the light guide bar 100.

It should be noted that, because of the perspective, FIG. 1 only illustrates three light sources 12 on the right side of FIG. 1. In fact, there are three other light sources 12 on the other ends of the three light guide bars 100. Of course, in some other embodiments, each light guide bar 100 may have one light source 12 on only one end thereof. Of course, the light source 12 is not necessarily disposed on the end of the light guide bar 100. In an embodiment not shown here, if the light guide bar 100 has a light source recess (not shown) in the middle, the light source 12 may extend into the light guide bar 100 through the light source recess to be located in the light guide bar 100.

The light guide bar 100 of the connector assembly 20 of this embodiment may be inserted into the gap between the two adjacent connectors 30 from above, and the light guide bar 100 and the connectors 30 are fixed to one another through a structural design. Details of the light guide bar 100 and the connectors 30 are described hereinafter.

Figure 2:
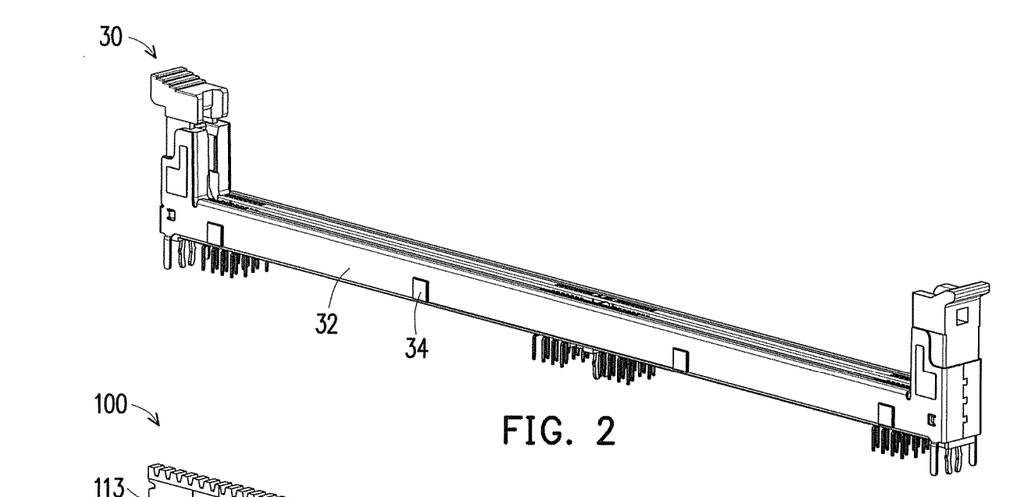
FIG. 2 is a schematic view of a connector of the connector assembly of FIG. 1.

FIG. 2 is a schematic view of the connector of the connector assembly of FIG. 1. Referring to FIG. 2, the connector 30 has two opposite connector lateral walls 32. Because of the perspective, FIG. 2 only illustrates one of the connector lateral walls 32. The other connector lateral wall 32 that is the same as or similar to the illustrated connector lateral wall 32 is on the other side of the connector 30. FIG. 2 clearly shows that the connector 30 includes a plurality of positioning protrusions 34 that protrude from the connector lateral wall 32. The positioning protrusions 34 are arranged at equal intervals. In this embodiment, each of the connector lateral walls 32 has four positioning protrusions 34. Nevertheless, the number and arrangement of the positioning protrusions 34 on the connector lateral wall 32 are not limited thereto. In some other embodiments, the connector lateral wall 32 may have only one positioning protrusion 34 in the center or have two positioning protrusions 34 respectively close to the two ends. In addition, the two connector lateral walls 32 of the connector 30 may have the same or different numbers of positioning protrusions 34 thereon, or the positioning protrusions 34 may have the same or different arrangements.

Figure 3:
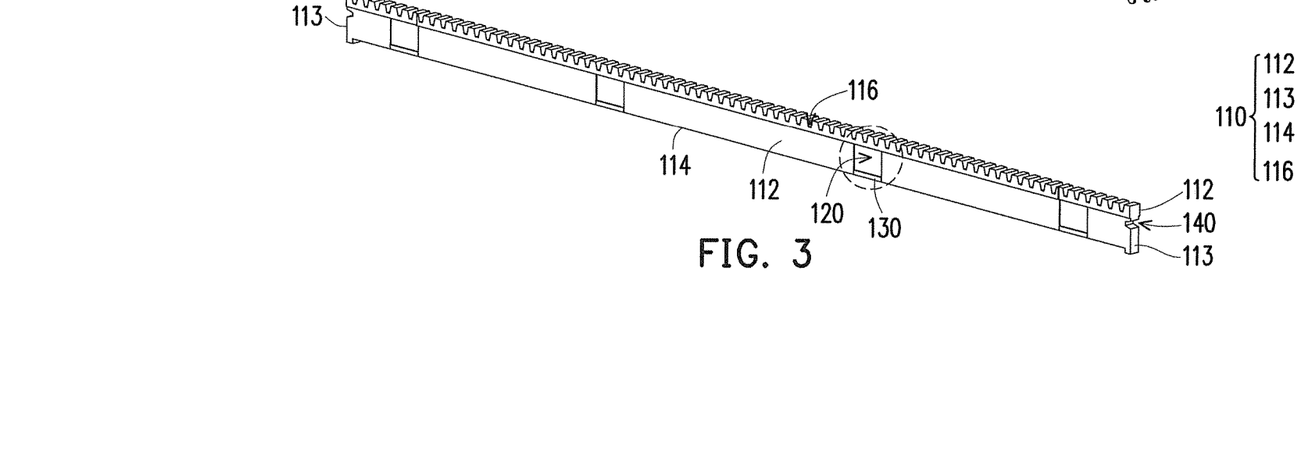
FIG. 3 is a schematic view of a light guide bar of the connector assembly of FIG. 1.
Figure 4:
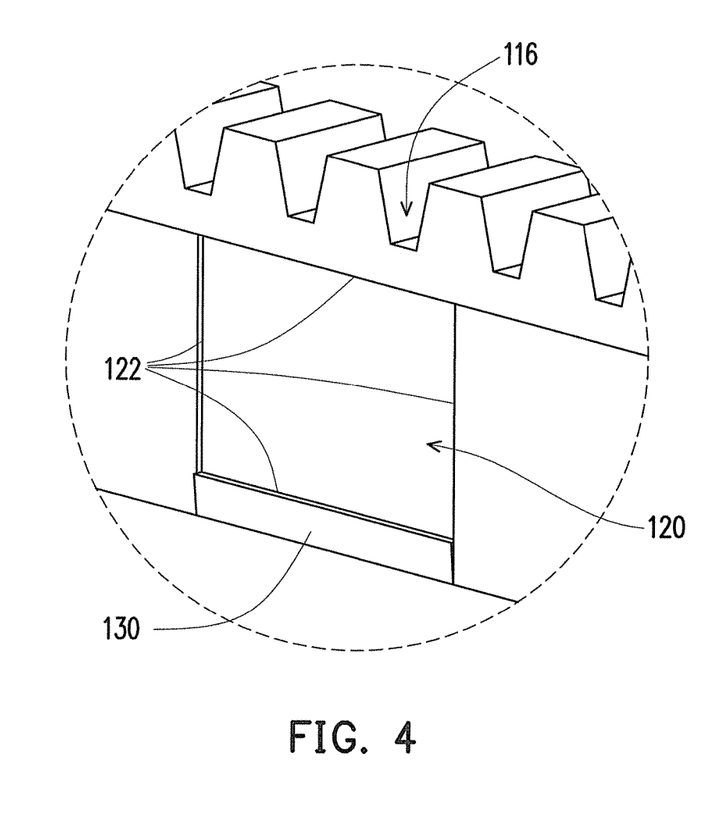
FIG. 4 is a partially enlarged view of FIG. 3.

FIG. 3 is a schematic view of the light guide bar of the connector assembly of FIG. 1. FIG. 4 is a partially enlarged view of FIG. 3. Referring to FIG. 3 and FIG. 4, the light guide bar 100 includes a light guide bar body 110 and at least one guiding part 130. In FIG. 3, the light guide bar body 110 has four light guide bar lateral walls 112 and 113, a light guide bar bottom surface 114 connected with the light guide bar lateral walls 112 and 113, and at least one positioning recess 120. Each of the light guide bar lateral walls 112 is connected to the two light guide bar lateral walls 113, and each of the light guide bar lateral walls 113 is connected to the two light guide bar lateral walls 112. The areas of the two light guide bar lateral walls 112 are respectively greater than the areas of the two light guide bar lateral walls 113. One of the light guide bar lateral walls 112 is opposite to the other one of the light guide bar lateral walls 112. Likewise, because of the perspective, FIG. 3 illustrates only one of the light guide bar lateral walls 112. The other light guide bar lateral wall 112 that is the same as or similar to the illustrated light guide bar lateral wall 112 is on the other side of the light guide bar 100. FIG. 3 clearly shows that four positioning recesses 120 are arranged at equal intervals on the light guide bar lateral wall 112. Four guiding parts 130 are disposed on the light guide bar lateral wall 112 and located between the four positioning recesses 120 and the light guide bar bottom surface 114.

Of course, the number and arrangement of the positioning recesses 120 on the light guide bar lateral wall 112 and the number of the guiding parts 130 on the light guide bar lateral wall 112 are not limited to the above. The invention only requires that the number and arrangement of the positioning recesses 120 on the light guide bar lateral wall 112 correspond to the number and arrangement of the positioning protrusions 34 on the connector lateral wall 32, and the number of the guiding parts 130 corresponds to the number of the positioning recesses 120.

In addition, it is known from FIG. 4 that each of the positioning recesses 120 is surrounded by four restricting surfaces 122 and a top surface of the guiding part 130 serves as one of the restricting surfaces 122. In this embodiment, in order that the light guide bar 100 is smoothly inserted into the gap between two adjacent connectors 30 from above without being stuck by the positioning protrusions 34 of the connector 30, in this embodiment, the guiding part 130 has an inclined surface, a bottom portion of the inclined surface is in contact with or is close to the light guide bar bottom surface 114 and gradually inclines outward away from the light guide bar bottom surface 114. Accordingly, as the light guide bar 100 is inserted into the gap between two adjacent connectors 30 from above, the inclined surface of the guiding part 130 of the light guide bar 100 slides along the positioning protrusion 34 of the connector 30 and is not blocked by the positioning protrusion 34.

Further, reverting to FIG. 3, the light guide bar body 110 includes a plurality of notches 116 on a surface (top surface) such that the top surface of the light guide bar body 110 has a plurality of toothed structures. A traveling direction of the light that enters the light guide bar 100 changes as the light passes through the toothed structures, so as to create a specific light effect. Of course, the shapes of the notches 116 on the light guide bar body 110 are not limited to the above and may be changed to change the shapes of the toothed structures so as to present jagged shapes or sine wave shapes, for example. In some other embodiments, the notches 116 on the light guide bar body 110 may be arranged irregularly or have different depths such that the top surface of the light guide bar body 110 is a rough surface. Moreover, in some other embodiments, the notches 116 may be formed inside rather than on the surface of the light guide bar body 110. For example, the notches 116 may be formed inside the light guide bar body 110 by laser engraving so as to create different light effects. Moreover, in some other embodiments, the notches 116 may be formed on the surface and inside the light guide bar body 110. The shape, location, depth, and arrangement of the notches 116 are not limited to the above.

Since the light guide bar 100 is disposed between two connectors 30, the light guide bar 100 is partially clamped by the two connectors 30. In order that the user can easily remove the light guide bar 100, as shown in FIG. 3, the light guide bar 100 includes a recessed pulling part 140 on one of the light guide bar lateral walls 113 that has no positioning recess 120 thereon for detaching the light guide bar 100 from the gap between the two connectors 30. The user may reach his finger into the pulling part 140 to pull up the light guide bar 100.

Figure 5:
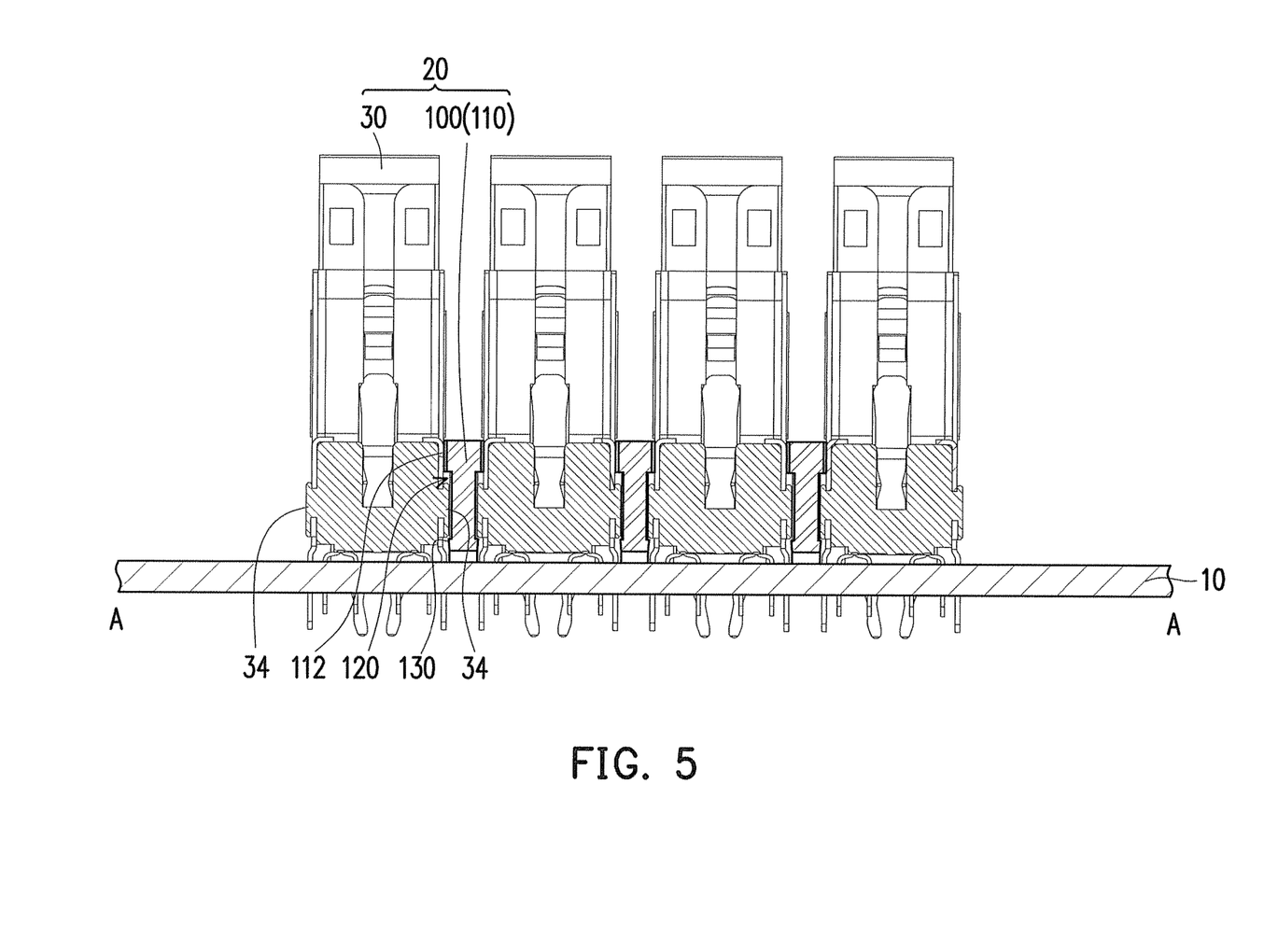
FIG. 5 is a schematic cross-sectional view taken along the line A-A of FIG. 1.

FIG. 5 is a schematic cross-sectional view taken along the line A-A of FIG. 1. Referring to FIG. 1 and FIG. 5, in FIG. 5, the light guide bar 100 is indicated by bold lines so as to distinguish the locations of the light guide bars 100 and the connectors 30. FIG. 5 clearly shows that the light guide bar 100 has an approximately I-shaped cross section, and each light guide bar 100 is clamped between two connectors 30. More specifically, two positioning protrusions 34 on two opposite connector lateral walls 32 of two adjacent connectors 30 enter two positioning recesses 120 on two opposite light guide bar lateral walls 112 of the light guide bar 100, such that the light guide bar 100 and the connectors 30 are fixed by engagement of the protrusions and recesses. It is known from FIG. 5 that a size of the positioning recess 120 may be slightly greater than a size of the positioning protrusion 34 so as to tolerate an error that may prevent the positioning protrusion 34 from entering the positioning recess 120. Of course, the positioning protrusion 34 of the connector 30 is still restricted by the four restricting surfaces 122 on the upper, lower, left, and right sides beside the positioning recess 120 of the light guide bar 100 and does not move to a large extent.

In addition, it is known from FIG. 5 that, in this embodiment, a distance between two opposite light guide bar lateral walls 112 in a region above the positioning recess 120 of the light guide bar 100 is close to a distance between two connector lateral walls 32 of two adjacent connectors 30. In other words, a width of the light guide bar 100 in the region above the positioning recess 120 is almost close to the gap between two adjacent connectors 30, such that after the light guide bar 100 is inserted into the gap between the two connectors 30, the region above the positioning recess 120 of the light guide bar 100 is clamped by the two connectors 30.

It should be noted that FIG. 5 clearly shows that the light guide bar 100 is located beside the connectors 30. Thus, when the connectors 30 receive a force in the horizontal direction of FIG. 5 (for example, an expansion card inserted into the connectors 30 may be overly heavy on one side and impose a force on the connectors 30 in the horizontal direction), the light guide bar 100 fixed beside the connectors 30 provides a counter force to reduce the possibility of crack of the connectors 30.

Figure 6:
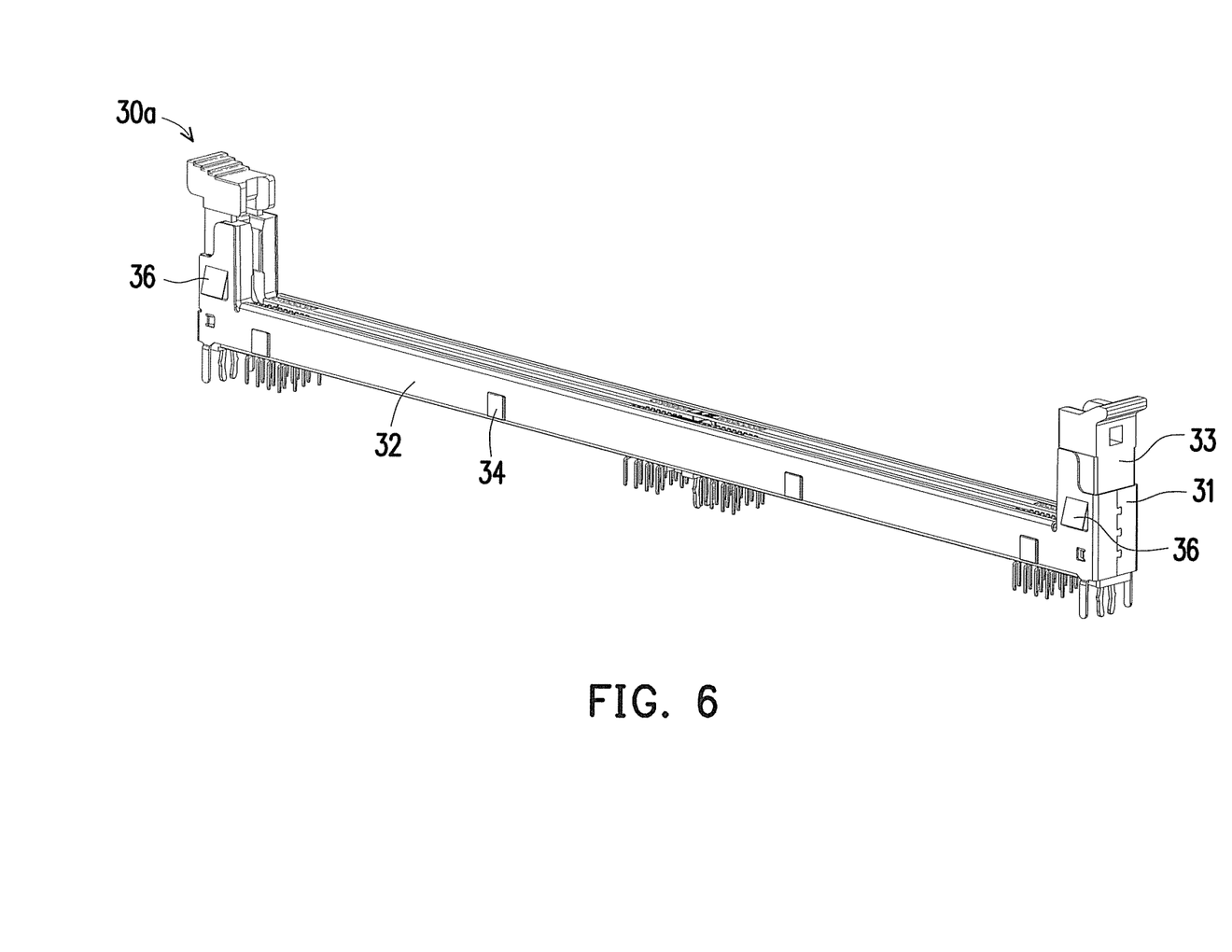
FIG. 6 is a schematic view of a connector of a connector assembly according to another embodiment of the invention.
Figure 7:
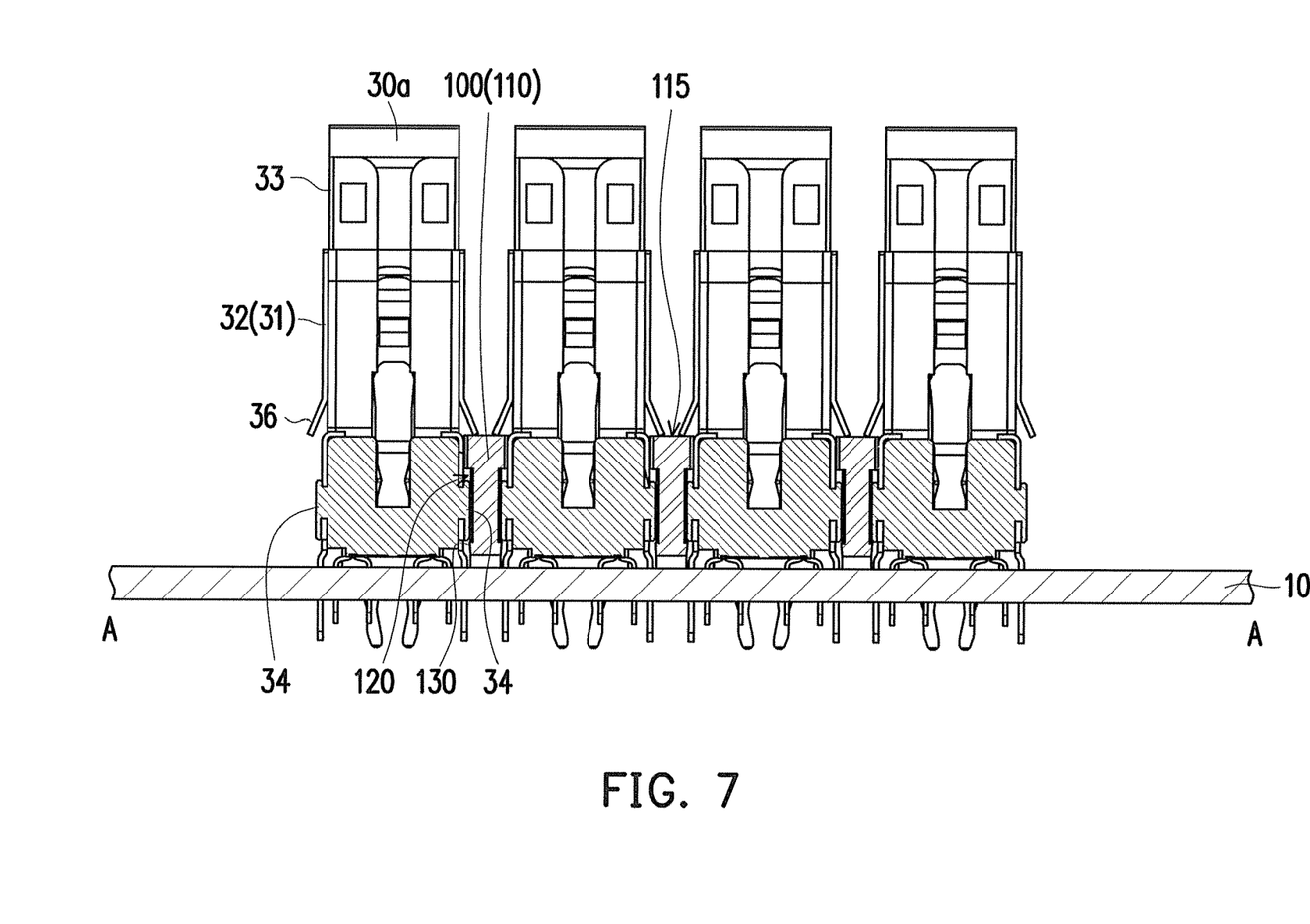
FIG. 7 is a schematic cross-sectional view of the connector assembly of FIG. 6.

FIG. 6 is a schematic view of a connector of a connector assembly according to another embodiment of the invention. FIG. 7 is a schematic cross-sectional view of the connector assembly of FIG. 6. It should be noted that, in the following embodiments, components the same as or similar to those of the previous embodiment are assigned with the same or similar reference numerals and thus detailed descriptions thereof are not repeated hereinafter.

Referring to FIG. 6 and FIG. 7, in this embodiment, a connector 30a includes a connector body 33 and a connector cover 31 that is disposed closely on the connector body 33 to increase structural strength of the connector body 33. The connector body 33 includes a positioning protrusion 34. A connector lateral wall 32 is one of the wall surfaces of the connector cover 31. The positioning protrusion 34 is exposed and protrudes from the connector cover 31. The connector cover 31 further includes a stopper 36 to abut against a light guide bar top surface 115 of the light guide bar body 110 of the light guide bar 100.

More specifically, in this embodiment, the connector cover 31 covers rising portions on left and right ends of the connector body 33. The connector cover 31 has two stoppers 36 on the rising portions on the left and right ends of the connector lateral wall 32. In this embodiment, each stopper 36 includes an inclined arm. The inclined arm is formed by forming a U-shaped opening on the connector cover 31 and then bending a portion surrounded by the U-shaped opening. Because the stopper 36 inclines outward, when the light guide bar 100 moves downward in the direction toward the main board 10 to be assembled between two adjacent connectors 30a, the light guide bar 100 moves downward along the inclined surface of the stopper 36 and at the same time pushes the stopper 36. In this process, the stopper 36 is slightly deformed toward the plane where the connector lateral wall 32 is located and restores to abut against the light guide bar top surface 115 of the light guide bar body 110 of the light guide bar 100 when the light guide bar 100 has passed. This design further prevents the light guide bar 100 from coming off.

Of course, in some other embodiments, the stopper 36 may be a protrusion embossed on the connector cover 31. The protrusion may be a single protruding dot, a bump, or a combination of a plurality of protruding dots and bumps. The form of the stopper 36 is not particularly limited as long as the stopper 36 slightly protrudes outward and abuts against the light guide bar top surface 115 of the light guide bar body 110 of the light guide bar 100 to prevent the light guide bar 100 from moving away from the main board 10.

It is worth mentioning that the stopper 36 in the form of the inclined arm provides a larger space for the light guide bar 100 to pass, and a length of the inclined arm that protrudes from the connector lateral wall 32 may be greater than a length of the protrusion that protrudes from the connector lateral wall 32. In other words, if the designer embosses the protrusion on the connector cover 31 to serve as the stopper 36, the length of the stopper 36 that protrudes from the connector lateral wall 32 needs to be taken into consideration, such that the stopper 36 does not block the light guide bar 100 from passing but is still able to abut against the light guide bar top surface 115 of the light guide bar body 110 of the light guide bar 100 after the light guide bar 100 is in position, so as to prevent the light guide bar 100 from moving away from the main board 10.

Figure 8:
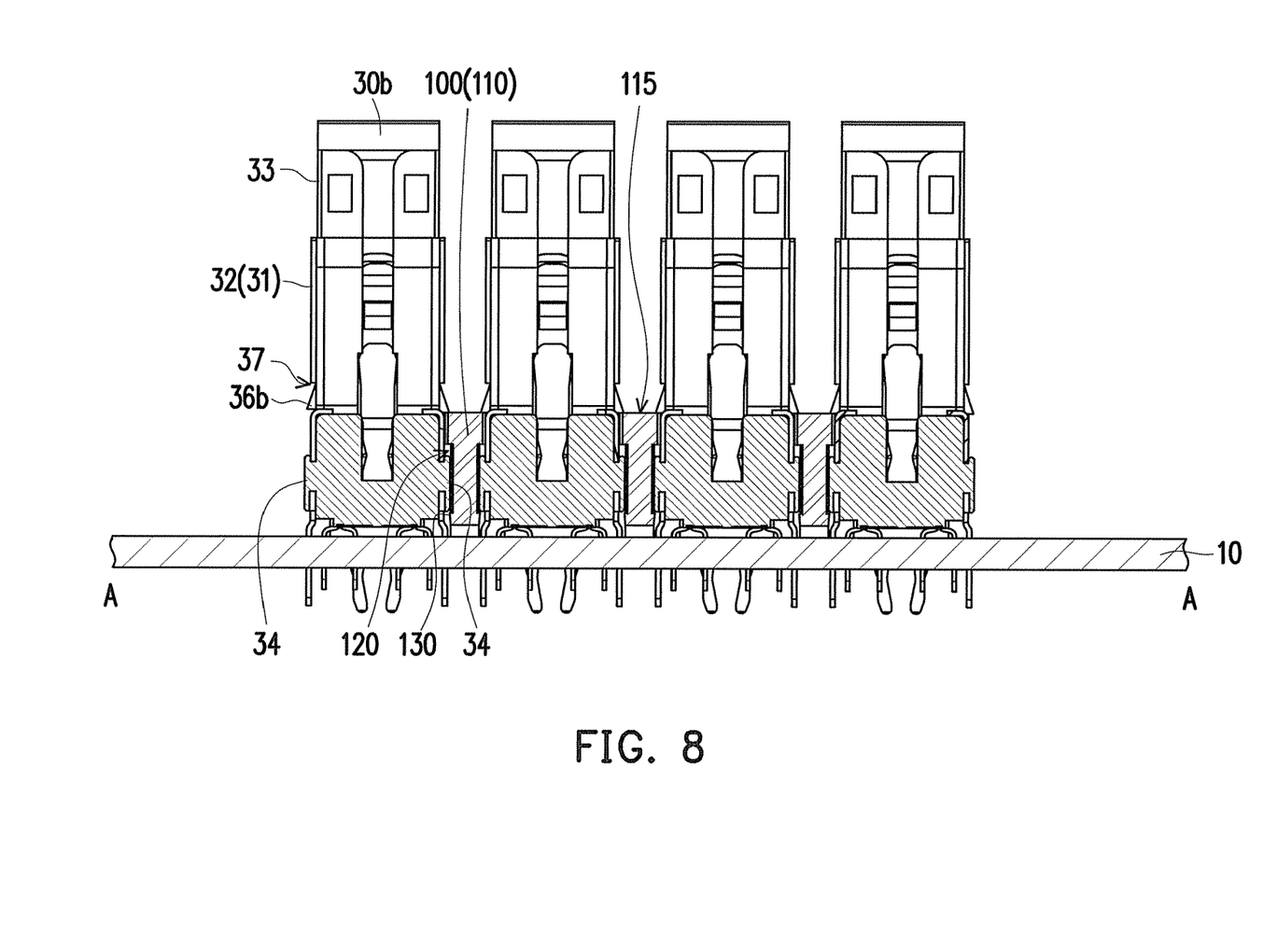
FIG. 8 is a schematic cross-sectional view of a connector assembly according to another embodiment of the invention.

FIG. 8 is a schematic cross-sectional view of a connector assembly according to another embodiment of the invention. Referring to FIG. 8, a main difference between this embodiment and the previous embodiment is that, in the previous embodiment, the stopper 36 that abuts against the light guide bar top surface 115 of the light guide bar body 110 of the light guide bar 100 is located on the connector cover 31; however, in this embodiment, a stopper 36b for abutting against the light guide bar top surface 115 of the light guide bar body 110 of the light guide bar 100 is located on the connector body 33 of a connector 30b. The connector cover 31 has an opening 37 at a position corresponding to the stopper 36b of the connector body 33, such that the stopper 36b of the connector body 33 is exposed through the opening 37. The stopper 36b may be a bump having an inclined surface, a single protruding dot, or a combination of a plurality of protruding dots, but the form of the stopper 36b of the connector body 33 is not limited to the aforementioned. Likewise, the stopper 36b of this embodiment is able to abut against the light guide bar top surface 115 of the light guide bar body 110 of the light guide bar 100 to keep the light guide bar 100 from moving away from the main board 10. In some other embodiments, a range of the connector body 33 covered by the connector cover 31 may be changed. For example, in an embodiment not shown here, a height of the connector cover 31 is reduced to be lower than the position of the opening 37, such that the stopper 36b is exposed outside the connector cover 31, and formation of the opening 37 on the connector cover 31 is not required.

It should be noted that, in some other embodiments, the connectors 30a and 30b only include the connector body 33 and do not have the connector cover 31. That is, the connector lateral wall 32 may be one of the wall surfaces of the connector body 33, and the positioning protrusion 34 and the stopper 36b are both located on the connector lateral wall 32 of the connector body 33. This configuration also achieves the function of fixing the light guide bar 100.

In conclusion, according to the invention, the light guide bar is disposed between two connectors, and the relative positions of the light guide bar and the two connectors are easily fixed by the engagement of the positioning protrusions of the connectors and the positioning recesses of the light guide bar. The light guide bar is adapted to be in contact with or close to the light sources on the main board, such that at least a portion of the light emitted by the light sources may enter the light guide bar to generate a strip light between the two connectors for indicating the locations of the connectors in the dark as well as achieving the effect of decoration. In addition, if a heavier expansion card is inserted onto the connector and causes a side of the connector to be pressed by the expansion card, the connector may crack. According to the invention, the light guide bar is disposed beside the connector and applies a counter force on the connector to prevent the connector from being cracked.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A light guide bar adapted to be disposed between two connectors, wherein the two connectors are disposed on a main board and each of the two connectors comprise a connector lateral wall, and at least one of the two connectors comprises a positioning protrusion that protrudes from the connector lateral wall, the light guide bar comprising:
   a light guide bar body comprising two pairs of opposite light guide bar lateral walls and at least one positioning recess, wherein the two pairs of opposite light guide bar lateral walls have different lengths, each of the at least one positioning recess is formed on one of longer pair of the light guide bar lateral walls and the at least one positioning recess is adapted to be positioned on the positioning protrusion of the at least one of the connectors,
   wherein one of the light guide bar lateral walls is adapted to introduce light emitted from a light source that is disposed on the main board at a position close to the two connectors, and the light guide bar lateral wall is located beside the light source.

2. The light guide bar according to claim 1, wherein the two connectors respectively comprise the two opposite connector lateral walls and the two positioning protrusions that protrude from the two connector lateral walls, and the light guide bar body comprises the two positioning recesses that respectively are formed on the two light guide bar lateral walls and are adapted to be positioned on the two positioning protrusions of the two connectors.

3. The light guide bar according to claim 1, wherein the light guide bar body comprises a light guide bar bottom surface connecting the two light guide bar lateral walls, the light guide bar further comprises at least one guiding part, and each of the at least one guiding part is disposed on one of the light guide bar lateral walls and located between the positioning recess and the light guide bar bottom surface.

4. The light guide bar according to claim 1, wherein the at least one positioning recess is surrounded and defined by a plurality of restricting surfaces.

5. The light guide bar according to claim 1, wherein the light guide bar body further comprises a plurality of notches located on a surface of the light guide bar body or inside the light guide bar body.

6. The light guide bar according to claim 1, wherein the light guide bar body further comprises four light guide bar lateral walls, each of the light guide bar lateral walls is connected to the two adjacent light guide bar lateral walls respectively, and one of the light guide bar lateral walls that does not comprise the positioning recess comprises a protruding or a recessed pulling part.

7. A connector assembly adapted to be disposed on a main board, the connector assembly comprising:
   at least two connectors arranged in parallel and each of the two connectors comprising a connector lateral wall, wherein at least one of the at least two connectors comprises a positioning protrusion that protrudes from the connector lateral wall; and
   at least one light guide bar each disposed between adjacent two of the at least two connectors and each comprising:
   a light guide bar body comprising two pairs of opposite light guide bar lateral walls and at least one positioning recess, wherein the two pairs opposite light guide bar lateral walls have different lengths, each of the at least one positioning recess is formed on one of longer pair of the light guide bar lateral walls and the at least one positioning recess is adapted to be positioned on the positioning protrusion of the at least one of the at least two connectors,
   wherein one of the light guide bar lateral walls is adapted to introduce light emitted from a light source that is disposed on the main board at a position close to the two connectors, and the light guide bar lateral wall is located beside the light source.

8. The connector assembly according to claim 7, wherein adjacent two of the at least two connectors respectively comprise the two opposite connector lateral walls and the two positioning protrusions that protrude from the two connector lateral walls, wherein each light guide bar body comprises the two positioning recesses that respectively formed on the two light guide bar lateral walls and are adapted to be positioned on the two positioning protrusions of the adjacent two of the at least two connectors.

9. The connector assembly according to claim 7, wherein each light guide bar body further comprises a light guide bar bottom surface connecting the two light guide bar lateral walls, each of the at least one light guide bar comprises at least one guiding part, and each of the at least one guiding part is disposed on one of the light guide bar lateral walls and located between the positioning recess and the light guide bar bottom surface.

10. The connector assembly according to claim 7, wherein the at least one positioning recess is surrounded and defined by a plurality of restricting surfaces.

11. The connector assembly according to claim 7, wherein each light guide bar body further comprises a plurality of notches located on a surface of the light guide bar body or inside the light guide bar body.

12. The connector assembly according to claim 7, wherein each light guide bar body further comprises four light guide bar lateral walls, each of the light guide bar lateral walls is connected to the two adjacent light guide bar lateral walls respectively, and one of the light guide bar lateral walls that does not comprise the positioning recess comprises a protruding or recessed pulling part.

13. The connector assembly according to claim 7, wherein each of the connectors comprises a stopper that protrudes from the connector lateral wall and abuts against a light guide bar top surface of the light guide bar body.

14. The connector assembly according to claim 13, wherein the connector comprises a connector body and a connector cover disposed closely outside the connector body, wherein the connector body comprises the positioning protrusion, the connector lateral wall is a wall surface of the connector cover, and the positioning protrusion is exposed and protrudes from the connector cover.

15. The connector assembly according to claim 14, wherein the connector cover comprises the stopper that comprises an inclined arm or a protrusion.

16. The connector assembly according to claim 14, wherein the connector body comprises the stopper that is exposed from the connector cover.

* * * * *